(12) United States Patent
Turner et al.

(10) Patent No.: US 11,930,870 B2
(45) Date of Patent: Mar. 19, 2024

(54) MULTI-LAYERED REVERSIBLE WICKING AND ABSORBING SWEATBAND, AND RELATED MANUFACTURING METHODS

(71) Applicant: Sweat Heaven Apparel LC, Houston, TX (US)

(72) Inventors: Jacqueline Rose Turner, Houston, TX (US); Rosita Angelica Torres, Heathsville, VA (US)

(73) Assignee: Sweat Heaven Apparel LC, Houston, TX (US)

( * ) Notice: Subject to any disclaimer, the term of this patent is extended or adjusted under 35 U.S.C. 154(b) by 707 days.

(21) Appl. No.: 17/062,451

(22) Filed: Oct. 2, 2020

(65) Prior Publication Data
US 2021/0100300 A1 Apr. 8, 2021

Related U.S. Application Data

(60) Provisional application No. 62/909,771, filed on Oct. 3, 2019.

(51) Int. Cl.
*A41D 20/00* (2006.01)
*A41D 31/12* (2019.01)
*B32B 5/26* (2006.01)

(52) U.S. Cl.
CPC ........... *A41D 20/00* (2013.01); *A41D 31/125* (2019.02); *B32B 5/26* (2013.01)

(58) Field of Classification Search
CPC ......... A41D 20/00; A41D 31/125; A42C 5/02
See application file for complete search history.

(56) References Cited

U.S. PATENT DOCUMENTS

| | | | | |
|---|---|---|---|---|
| 4,832,010 A | * | 5/1989 | Lerman | A61F 13/061 2/24 |
| 4,896,378 A | * | 1/1990 | Campana | A41D 20/00 2/910 |
| 5,329,638 A | * | 7/1994 | Hansen | A41D 13/088 2/16 |
| 5,823,012 A | * | 10/1998 | Hacskaylo | D04B 1/126 66/171 |
| 8,661,567 B1 | * | 3/2014 | Hoover | A41D 20/00 2/170 |
| 9,456,650 B1 | * | 10/2016 | Boyce | A42C 5/02 |

* cited by examiner

*Primary Examiner* — Tajash D Patel
(74) *Attorney, Agent, or Firm* — Quisenberry Law PLLC

(57) ABSTRACT

A multi-layered and reversible sweatband is disclosed. A sweatband may include an outer wicking sheath made of eco-friendly and antimicrobial bamboo blended with a stretchable material such as nylon, lycra or spandex. The sweatband may also include a second wicking sheath having an absorbent material comprised mainly of bamboo maintained with the second wicking sheath. These layers are preferably mirrored and stitched together in such a way that two absorbent layers are facing each other in combination with double wicking layers on each side of the side-by-side absorbent layers. The sweatband maintains its structure without the use of a fastening device and is fully reversible. The sweatband may include multiple designs and ornamentations, and can be placed on multiple body parts due to its variability in sizing based on the length and width of the fabric used. Methods of manufacturing sweatbands in accordance with the present inventions are also disclosed.

20 Claims, 15 Drawing Sheets

MULTI-LAYERED REVERSIBLE WICKING AND ABSORBING SWEATBAND, AND RELATED MANUFACTURING METHODS

RELATED APPLICATIONS

This application claims the benefit of U.S. Provisional Application No. 62/909,771, filed Oct. 3, 2019, the contents of which are fully incorporated herein by reference.

BACKGROUND OF THE INVENTIONS

1. Field of the Inventions

The present inventions generally pertain to sweatbands, and more particularly to multi-layered sweatbands that avoid the use of fasteners on the sweatband.

2. Description of the Related Art

It is well known for athletes to wear sweatbands, such as around their head and/or wrists, to absorb sweat and keep sweat from running into the athlete's eyes. Current sweatbands are generally comprised of cotton-based materials such as terry cloth. These generally are not comfortable and become saturated and bulky. Moreover, microbes grow on the materials and produce an odor if not immediately cleaned. Multiple washings of the cotton-based materials often cause them to become stiff and creating discomfort for the wearer.

Newer sweatbands utilizing lightweight wicking materials have been developed that are more breathable. These products are usually comprised heavily of nylon or spandex as an outer wicking layer, and have inner layers made from sponge materials. These newer products require the use of non-absorbent fasteners to secure the device onto the user such that the absorbent properties are not consistent throughout the device. These types of modern sweatbands are usually seen in headbands, but not usually on the wrist as they are not absorbent enough, and fasteners are uncomfortable and not stylish when the sweatband is worn on the wrists.

Still, athletes continue to wear terry-cloth sweatbands primarily on their wrists with few newer methods being employed that advance the comfort and effectiveness of the traditional band. There is a need for improved sweatbands that overcome the problems as described above. As will become apparent from the following descriptions and discussion, the present inventions encompass improved sweatbands and related methods for manufacturing improved sweatbands.

SUMMARY OF THE INVENTIONS

In one aspect, the present inventions may comprise a sweatband comprising: a tubular body member formed of multiple layers of fabric, the multiple layers of fabric including an outer layer, a first internal layer, a second internal layer and an inner layer, a first side of the outer layer defining an exterior surface of the tubular body member, a second side of the outer layer being disposed adjacent a first side of the first internal layer, a second side of the first internal layer being disposed adjacent a second side of the second internal layer, a first side of the second internal layer being disposed adjacent a second side of the inner layer, and a first side of the second inner layer defining an interior surface of the tubular member. Another feature of this aspect of the present inventions may be that the first side of the outer layer may include a wicking surface, the first side of the first internal layer includes a wicking surface, the first internal layer includes an absorbent material, the second internal layer includes an absorbent material, the first side of the second internal layer includes a wicking surface, and the first side of the inner layer includes a wicking surface. Another feature of this aspect of the present inventions may be that each of the outer layer and the inner layer may include a french terry material including bamboo, and each of the first internal layer and the second internal layer includes a fleece material including bamboo. Another feature of this aspect of the present inventions may be that each of the first internal layer and the second internal layer may include an absorbent material. Another feature of this aspect of the present inventions may be that each of the outer layer, the first internal layer, the second internal layer, and the inner layer may comprise a fabric material containing bamboo. Another feature of this aspect of the present inventions may be that the fabric material may further contain at least one of nylon, lycra, and spandex. Another feature of this aspect of the present inventions may be that each of the outer layer and the inner layer may be formed of a french terry material containing bamboo, the french terry material including a loop surface on one side and a smooth surface on the other side, the first side of the outer layer corresponding to a loop surface of french terry material, the second side of the outer layer corresponding to a smooth surface of french terry material, the first side of the inner layer corresponding to a loop surface of french terry material, and the second side of the inner layer corresponding to a smooth surface of french terry material. Another feature of this aspect of the present inventions may be that each of the first internal layer and the second internal layer may be formed of a fleece material containing bamboo, the fleece terry material including a wicking surface on one side and an absorbent surface on the other side, the first side of the first internal layer corresponding to a wicking surface of fleece material, the second side of the first internal layer corresponding to an absorbent surface of fleece material, the second side of the second internal layer corresponding to an absorbent surface of fleece material, and the first side of the second internal layer corresponding to a wicking surface of fleece material.

In another aspect, the present inventions may include a sweatband comprising a tubular body member formed of multiple layers of fabric, the multiple layers of fabric including an outer layer, a first internal layer, a second internal layer and an inner layer, a first side of the outer layer defining an exterior surface of the tubular body member and including a wicking surface, a second side of the outer layer being disposed adjacent a first side of the first internal layer, the first side of the first internal layer including a wicking surface, the first internal layer including an absorbent material, a second side of the first internal layer being disposed adjacent a second side of the second internal layer, the second internal layer including an absorbent material disposed adjacent the absorbent material in the first internal layer, a first side of the second internal layer being disposed adjacent a second side of the inner layer and including a wicking surface, and a first side of the inner layer defining an interior surface of the tubular member and including a wicking surface. Another feature of this aspect of the present inventions may be that each of the outer layer and the inner layer may include a french terry material including bamboo, and each of the first internal layer and the second internal layer may include a fleece material including bamboo. Another feature of this aspect of the present inventions may be that each of the outer layer, the first internal layer, the second internal layer, and the inner layer may comprise a fabric material containing bamboo. Another feature of this aspect of the present inventions may be that the fabric material may further contain at least one of nylon, lycra, and spandex. Another feature of this aspect of the present inventions may be that each of the outer layer and the inner layer may be formed of a french terry material containing bamboo, the french terry material including a loop surface on one side and a smooth surface on the other side, the first side of the outer layer corresponding to a loop surface of french terry material, the second side of the outer layer corresponding to a smooth surface of french terry material, the first side of the inner layer corresponding to a loop surface of french terry material, and the second side of the inner layer corresponding to a smooth surface of french terry material. Another feature of this aspect of the present inventions may be that each of the first internal layer and the second internal layer may be formed of a fleece material containing bamboo, the fleece terry material including a wicking surface on one side and an absorbent surface on the other side, the first side of the first internal layer corresponding to a wicking surface of fleece material, the second side of the first internal layer corresponding to an absorbent surface of fleece material, the second side of the second internal layer corresponding to an absorbent surface of fleece material, and the first side of the second internal layer corresponding to a wicking surface of fleece material.

In another aspect, the present inventions may include a method of making a multi-layered, reversible sweatband comprising: (a) providing an inner layer comprising a first rectangular piece of fabric material having a left edge, a top edge, a right edge, a bottom edge, a first side, and a second side; (b) providing an outer layer comprising a second rectangular piece of fabric material having a left side, a top side, a right side, a bottom side, a first side, and a second side; (c) positioning the outer layer on top of the inner layer with the second side of the outer layer resting on top of the first side of the inner layer, the left edge of the outer layer disposed adjacent the left edge of the inner layer, the top edge of the outer layer disposed adjacent the top edge of the inner layer, the right edge of the outer layer disposed adjacent the right edge of the inner layer, and the bottom edge of the outer layer disposed adjacent the bottom edge of the inner layer; (d) folding the outer layer and inner layer over together and positioning the left edges of the outer layer and the inner layer adjacent the right edges of the outer layer and the inner layer to define a vertical edge and to form a vertical fold opposite and generally parallel to the vertical edge; (e) sewing the left edges of the outer layer and the inner layer and the right edges of the outer layer and inner layer together along the vertical edge so as to form a tube; (f) turning the tube inside out so the first side of the outer layer is on the outside of the tube, an upper end of the tube is defined by the top edges of the inner layer and the outer layer, and a lower end of the tube is defined by the bottom edges of the inner layer and the outer layer; (g) rolling the tube over on itself until the lower end of the tube is adjacent the upper end of the tube to form a tubular body member, the tubular body member having a first end defined by a fold and a second end defined by the lower and upper ends of the tube, and the second side of the inner layer is on the outside of the tubular body member; (h) sewing a portion of the fabric layers defining the second end of the tubular body member together so as to leave an opening adjacent the second end of the tubular body member; and (i) inverting the tubular body member by pulling the fabric material through the opening so that the first side of the outer layer defines an exterior surface of the tubular body member and an interior surface of the tubular member. Another feature of this aspect of the present inventions may be that the first rectangular piece of fabric material that forms the inner layer may be an absorbent material. Another feature of this aspect of the present inventions may be that the first rectangular piece of fabric material that forms the inner layer may be a fleece material containing bamboo. Another feature of this aspect of the present inventions may be that the second rectangular piece of fabric material that forms the outer layer may be a wicking material. Another feature of this aspect of the present inventions may be that the second rectangular piece of fabric material that forms the outer layer may be a french terry material containing bamboo, and the first side of the outer layer may be a loop side of the french terry material. Another feature of this aspect of the present inventions may be that the inner layer may include a fabric length generally parallel to the left and right edges of the inner layer, the outer layer may include a fabric length generally parallel to the left and right edges of the outer layer, and the fabric length of the inner layer may be positioned in generally parallel relationship to the fabric layer of the inner layer.

Other features, aspects and advantages of the present inventions will become apparent from the following discussion and detailed description.

Figure 1:
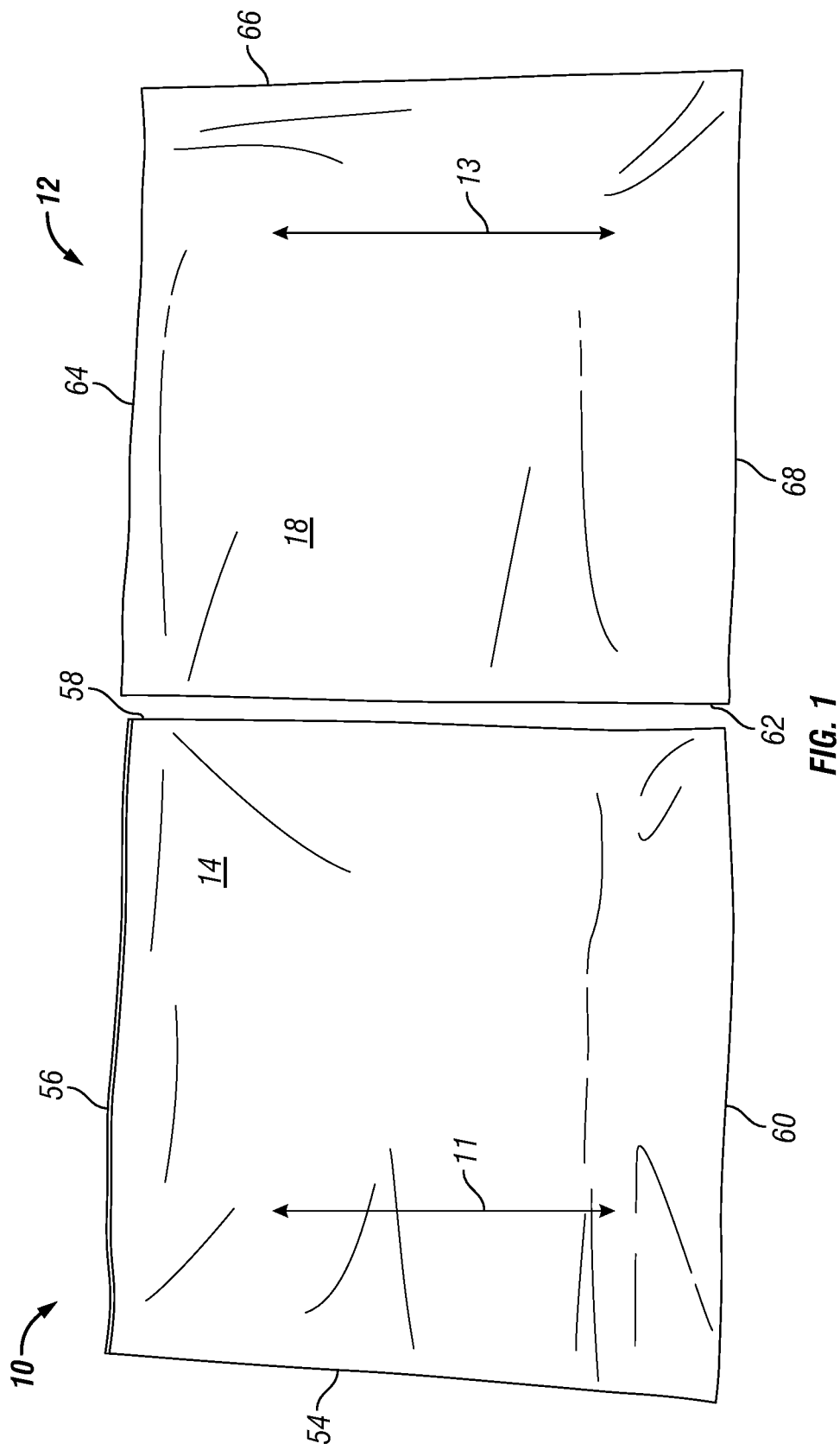
FIG. 1 is top view showing two pieces of fabric material—an inner layer and an outer layer—that may be used to construct a sweatband in accordance with the present inventions.

While the inventions will be described in connection with the specific embodiments disclosed, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

The present inventions will now be described more fully hereinafter with reference to the accompanying drawings, in which specific embodiments of the present inventions are illustrated. The present inventions may, however, be embodied in many different forms and should not be construed as limited to the embodiments set for herein. Rather, the disclosed specific embodiments are provided so that this disclosure will be thorough and complete, and will fully convey the scope of the present inventions to those skilled in the art.

Referring to the drawings in detail, wherein like numerals denote identical elements throughout the several views, the present inventions can best be understood by first explaining a specific method of manufacturing a specific embodiment of a sweat band constructed in accordance with the present inventions.

Referring to FIG. 1, it can be seen that a specific embodiment of a sweatband constructed in accordance with the present inventions may include an inner layer of fabric material 10 and an outer layer of fabric material 12. In a specific embodiment, the inner layer 10 may comprise a rectangular piece of 4-way stretch bamboo two-sided fleece material. In a specific embodiment, one side of the inner layer 10 may have a soft or fuzzy fleece surface that functions to absorb moisture, and the opposite side of the inner layer 10 may have a flat or wicking surface that functions to wick or channel moisture toward the soft or fuzzy fleece side. The inner layer 10 may include a left edge 54, a top edge 56, a right edge 58, and a bottom edge 60. In a specific embodiment, the outer layer 12 may comprise a wicking material. In a specific embodiment, the outer layer 12 may comprise a wicking sheath composed of ultra-soft bamboo and nylon. In a specific embodiment, the outer layer 12 may comprise a rectangular piece of 4-way stretch bamboo French terry material. The outer layer 12 may include a left edge 62, a top edge 64, a right edge 66, and a bottom edge 68. In a specific embodiment, the outer layer 12 may be made from bamboo materials, which are useful for their properties that naturally wick sweat away from the skin causing the sweat to migrate towards the inner layer 10. In a specific embodiment, the fabric wicking side 14 of the inner layer 10 may be disposed adjacent the outer layer 12. In a specific embodiment, the inner layer 10 may have a fabric length running in the direction of an arrowed line 11, which may be generally parallel to the left and right edges 54 and 58 of the inner layer 10. The phrase "fabric length" refers to the "lengthwise grain" of a fabric, which refers to the threads of a fabric that run the length of the fabric material, and parallel to the selvage of the fabric. The "selvage" is an edge produced on woven fabric during manufacture that prevents it from unraveling, and is also sometimes referred to as the cut edge of the fabric as it comes of a bolt. "Crosswise grain" of a fabric refers to the threads that run perpendicular to the selvage of the fabric. In a specific embodiment, the outer layer 12 may have a fabric length running in the direction of an arrowed line 13, which may be generally parallel to the left and right edges 62 and 66 of the outer layer 12.

Examples of fabric materials that be used to form the inner and outer layers 10 and 12 may be obtained from Nature's Fabrics based in Edinboro, Pennsylvania, whose website is www.naturefabrics.com. Examples of fabrics from Nature's Fabrics that may be used for the various layers of material according to the present inventions may be its Bamboo Terry, Jersey and Fleece fabrics, details of which are at the following web pages: https://naturesfabrics.com/collections/bamboo-terry, https://naturesfabrics.com/collections/solid-bamboo-spandex-jersey, and https://naturesfabrics.com/collections/bamboo-fleece. Another supplier of fabric materials that can be used to form the inner and outer layers 10 and 12 is Kinderel Organic Fabrics based in British Columbia, Canada, whose website is www.kinderel.com. Examples of fabrics from Kinderel Organic Fabrics that may be used for the various layers of material according to the present inventions may be its Bamboo Terry, Jersey and Fleece fabrics, details of which are at the following web pages: https://www.kinderel.com/collections/bamboo-french-terry-fabric, https://www.kinderel.com/collections/bamboo-jersey, and https://www.kinderel.com/collections/bamboo-fleece-fabric-1.

The present inventions are not limited to any particular sizes for the inner layer 10 and the outer layer 12. In a specific embodiment, which may be referred to as a 3.5 inch sweatband, the inner layer 10 and the outer layer 12 may each have a fabric length of 7⅜ inches and a fabric width of 7¾ inches. In another specific embodiment, which may be referred to as a 5 inch sweatband, the inner layer 10 and the outer layer 12 may each have a fabric length of 7⅜ inches and a fabric width of 10¾ inches. The seam allowance in each of these two embodiments may be ⅜ inch.

Figure 2:
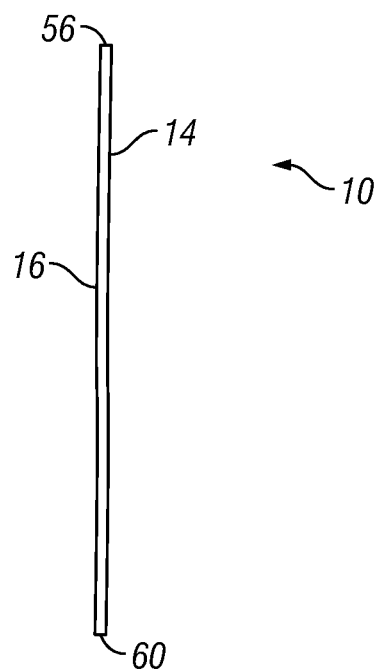
FIG. 2 is a side view of the inner layer shown in FIG. 1.

As shown in FIG. 2, in a specific embodiment, the inner layer 10 may include a first side 14 and a second side 16. In a specific embodiment, the first side 14 may be a smooth side of the fleece inner layer 10, and the second side 16 may be a soft side of the fleece inner layer 10. In a specific embodiment, the inner layer 10 may comprise a two-sided ultra-absorbing fabric composed of stretch bamboo with a wicking layer facing towards the outer layer 12, and an innermost absorbent layer on its opposite side. In a specific embodiment, the first side 14 and the second side 16 of the inner layer 10 may be two different functioning sides. In a specific embodiment, the first side 14 of the inner layer 10 may be a flat wicking sheath. In a specific embodiment, the second side 16 of the inner layer 10 may be an absorbent silky fleece.

Figure 3:
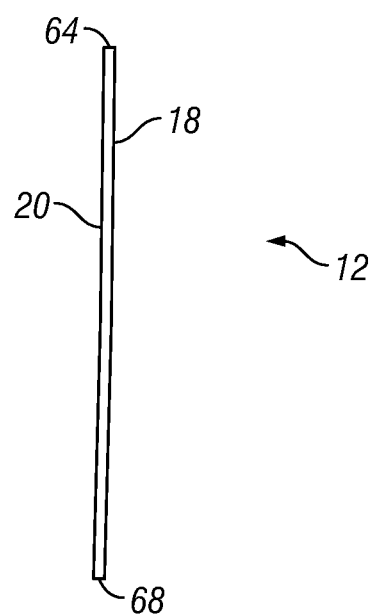
FIG. 3 is a side view of the outer layer shown in FIG. 1.

As shown in FIG. 3, in a specific embodiment, the outer layer 12 may include a first side 18 and a second side 20. In a specific embodiment, the first side 18 may be a loop side of the bamboo French terry outer layer 12, and the second side 20 may be a smooth side of the French terry outer layer 12.

Referring again to FIG. 1, in a specific embodiment of a manufacturing method according to the present inventions, the inner layer 10 and the outer layer 12 may be positioned on a flat surface side by side with the fabric length of each layer running vertically, as indicated by arrowed lines 11 and 13. The inner layer 10 (which in a specific embodiment may be a bamboo fleece material) may be positioned with its first or smooth or wicking side 14 facing up. The outer layer 12 (which in a specific embodiment may be a bamboo French terry material) may be positioned with the first or loop side 18 facing up.

Figure 4:
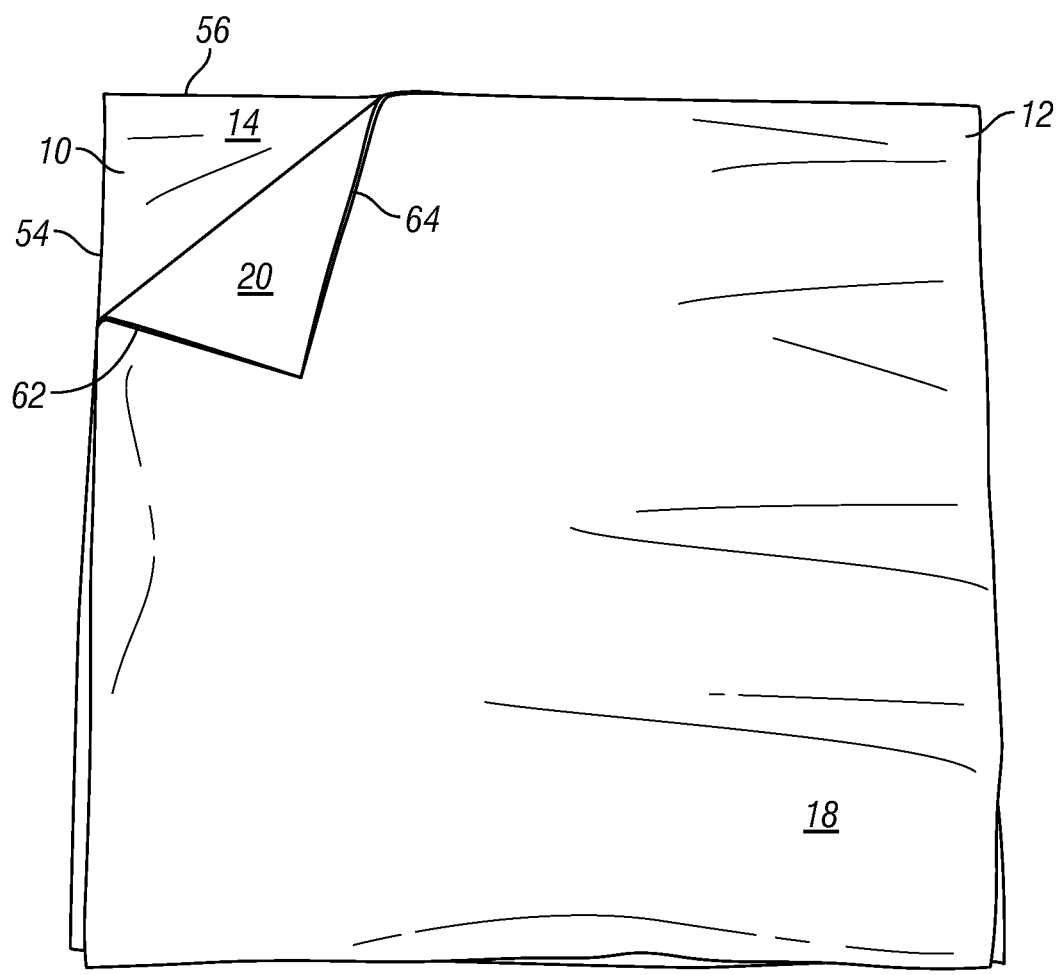
FIG. 4 is a top view showing the outer layer shown in FIG. 1 positioned on top of the inner layer shown in FIG. 1, and illustrates part of a specific embodiment of a novel method of manufacturing a sweatband in accordance with the present inventions.

Referring now to FIG. 4, in a specific embodiment, the next step may be to position the outer layer 12 on top of the inner layer 10. The upper left corner of the outer layer 12 is shown folded back to illustrate that the first or smooth or wicking side 14 of the inner fleece layer 10 is facing the second or smooth side 20 of the French terry outer layer 12. Stated differently, the French terry outer layer 12 is placed on top of the inner fleece layer 10 with the first or loop side 18 of the French terry layer 12 facing up. In a specific embodiment, the left edge 54 of the inner layer 10 may be disposed adjacent the left edge 62 of the outer layer 12, the top edge 56 of the inner layer 10 may be disposed adjacent the top edge 64 of the outer layer 12, the right edge 58 of the inner layer 10 may be disposed adjacent the right edge 66 of the outer layer 12, and the bottom edge 60 of the inner layer 10 may be disposed adjacent the bottom edge 68 of the outer layer 12.

Figure 5:
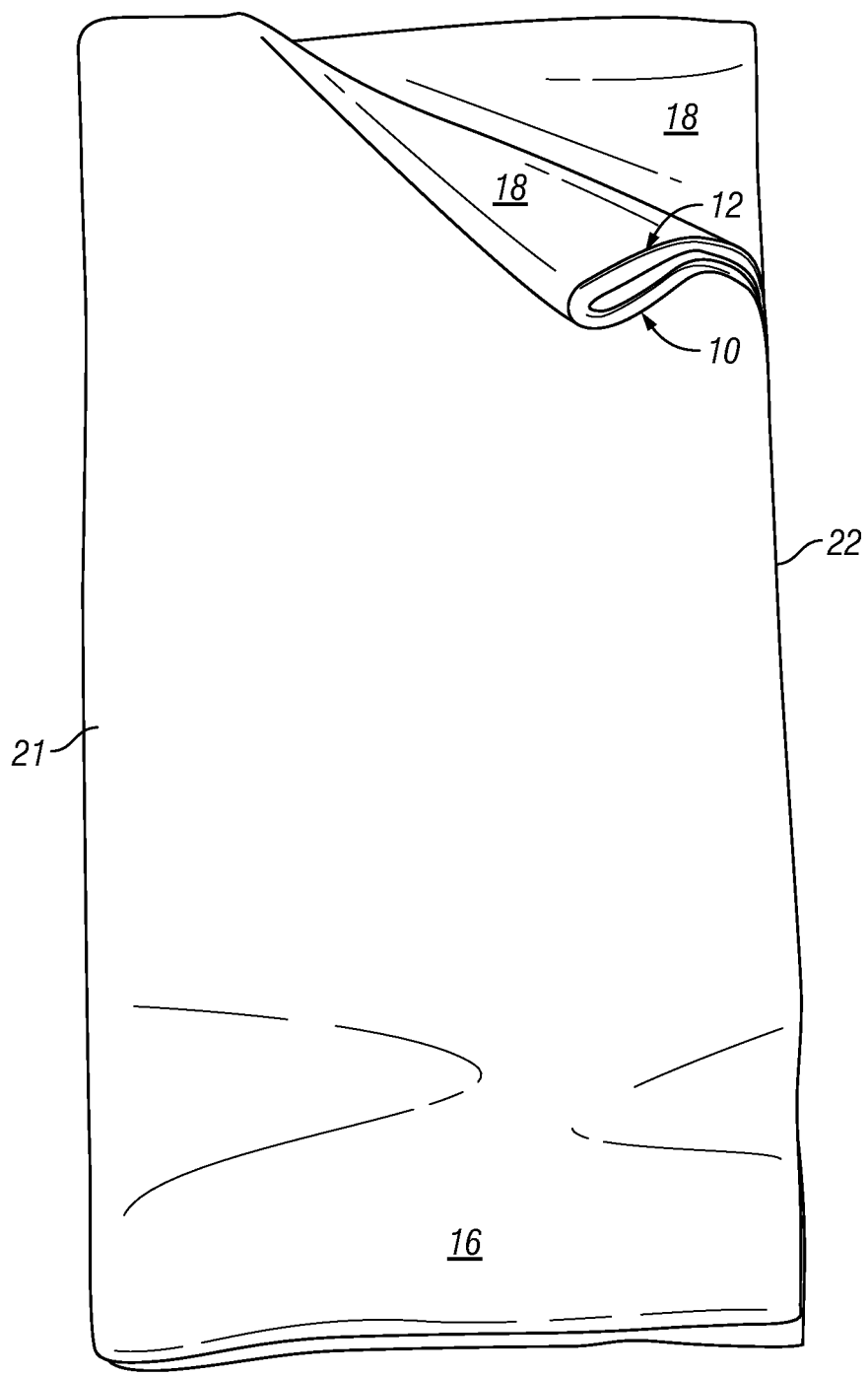
FIG. 5 is a top view showing the fabric layers shown in FIG. 4 folded over as part of a specific embodiment of a novel method of manufacturing a sweatband in accordance with the present inventions.

Referring now to FIG. 5, in a specific embodiment, the next step may be to fold both layers 10 and 12 over together in half from left to right so the second or soft side 16 of the inner fleece layer 10 faces up and the first or French terry loop side 18 face each other on the inside. This forms a fold 21, and results in two absorbent sides 18 facing each other. This is further illustrated in the upper right-hand portion of FIG. 5 in which a corner of the folded over portion of the inner and outer layers 10 and 12 are shown folded back at the upper right corner. By folding the inner and outer layers 10 and 12 over together, the left edges 54 and 62 of the inner and outer layers 10 and 12, respectively, are positioned adjacent the right edges 58 and 66 of the inner and outer layers 10 and 12, respectively, to define a vertical edge 22 and to form the vertical fold 21 opposite and generally parallel to the vertical edge 22.

Figure 6:
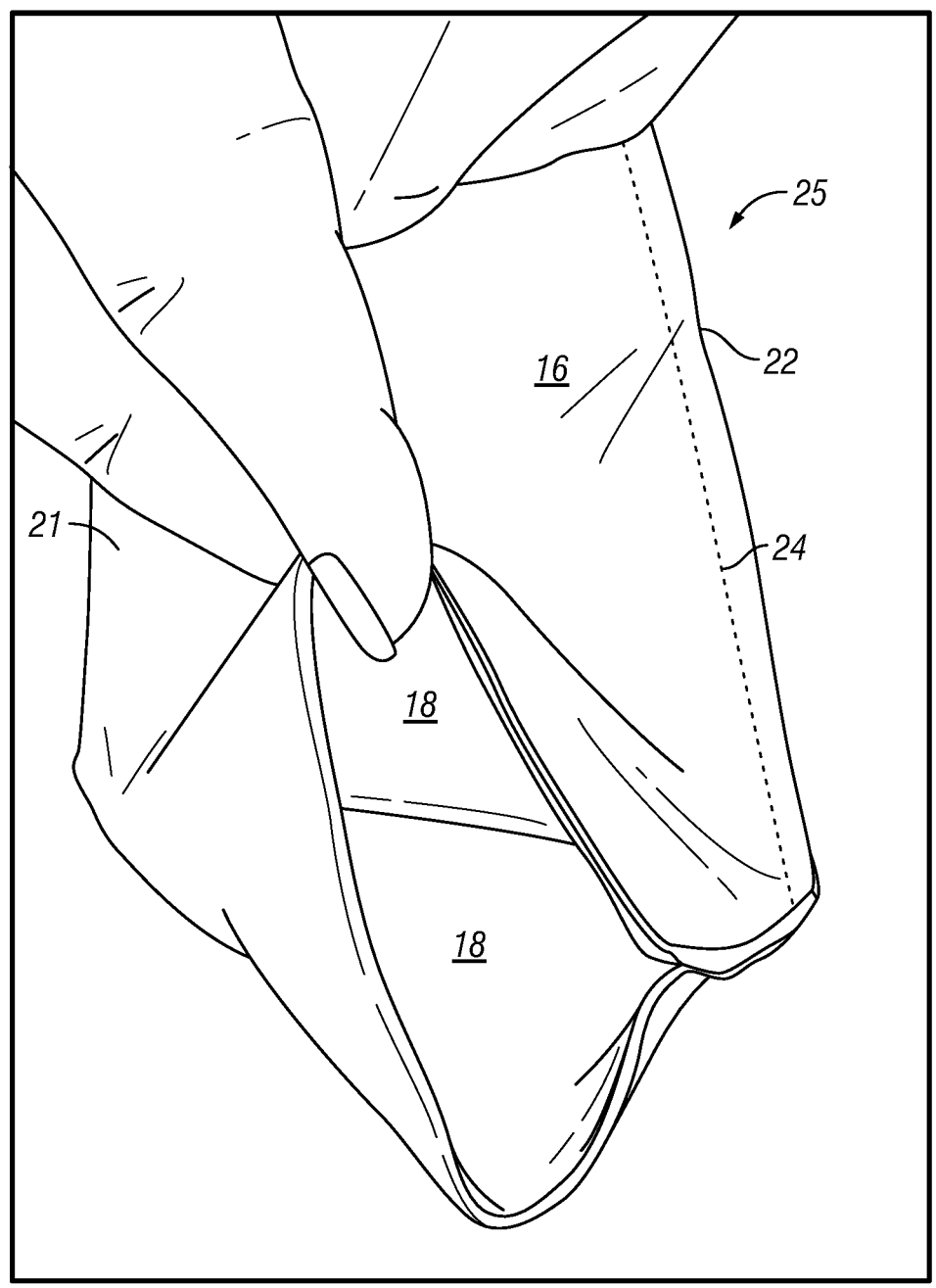
FIG. 6 is a perspective view showing vertical edges of the folded material shown in FIG. 5 sewn together by stitching to form a tube, and illustrates part of a specific embodiment of a novel method of manufacturing a sweatband in accordance with the present inventions.

Referring now to FIG. 6, in a specific embodiment, the next step may be to sew vertical edge 22 that is opposite the fold 21 together, such as shown by stitching 24. As explained above, the vertical edge 22 is defined by the left edges 54 and 62 and right edges 58 and 66 of the inner and outer layers 10 and 12, so that the stitching 24 sews the edges 54, 62, 58 and 66 together. In a specific embodiment, the stitching 24 may be by a flat overlock stitch. In a specific embodiment, after the two edges 22 are stitched together so as to form a seam 31 (shown in FIGS. 7-9 discussed below), they may be ironed and flattened out so that the user will not feel the seam when wearing the reverse side of the sweatband. By stitching the vertical edge 22, and at this stage of the manufacturing process of this specific embodiment, a tube 25 is formed, as shown in FIG. 6, which also shows that an inner surface of the tube 25 is formed by the first or terry loop side 18 of the french terry outer layer 12.

Figure 7:
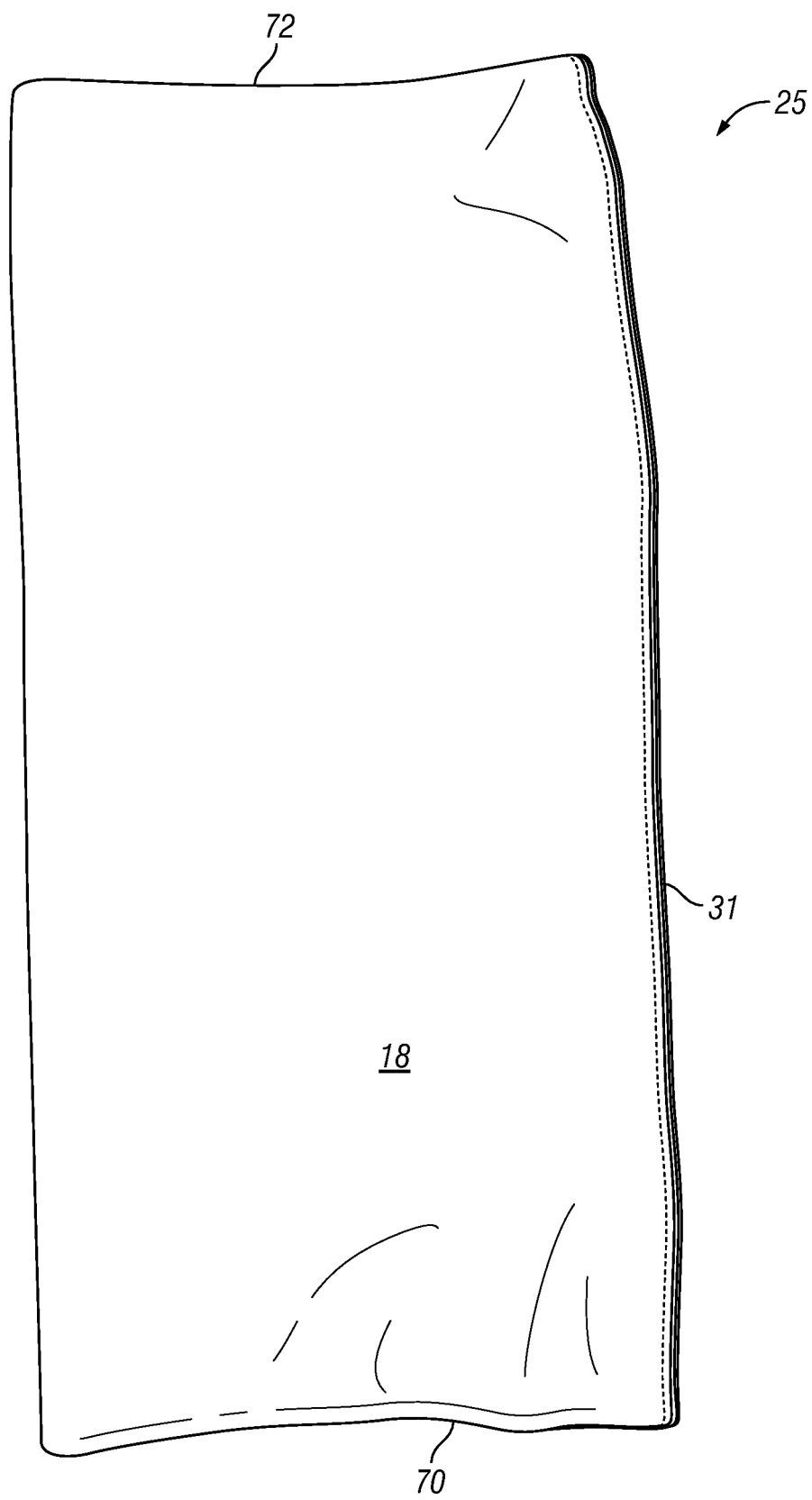
FIG. 7 is a top view showing the tube from FIG. 6 turned inside out, and illustrates part of a specific embodiment of a novel method of manufacturing a sweatband in accordance with the present inventions.

Referring now to FIG. 7, in a specific embodiment, the next step may be to flip the tube 25 inside out so that the first or french terry loop side 18 of the outer french terry layer 12 is facing out again. In a specific embodiment, a lower edge 70 of the tube 25 is defined by the bottom edges 60 and 68 of the inner and outer layers 10 and 12. In a specific embodiment, an upper edge 72 of the tube 25 is defined by the top edges 56 and 64 of the inner and outer layers 10 and 12.

Figure 8:
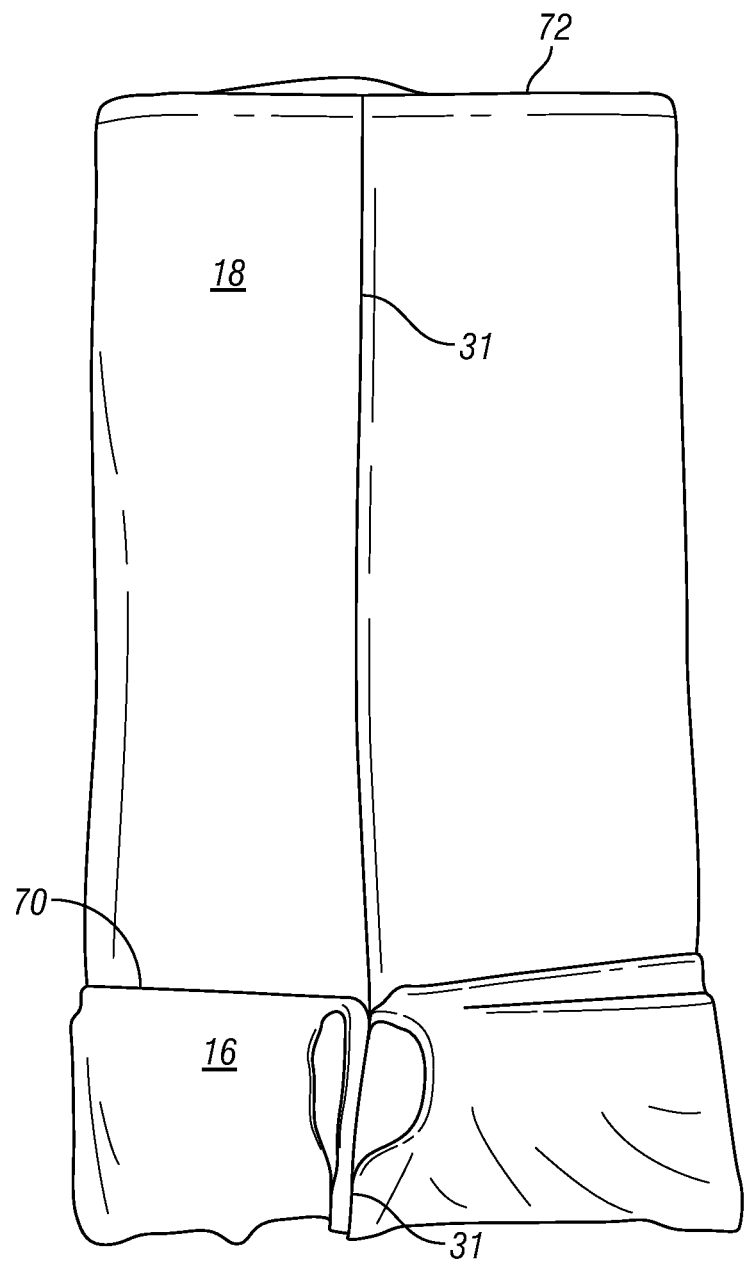
FIG. 8 is top view showing the tube from FIG. 7 in the process of being folded over on itself, and illustrates part of a specific embodiment of a novel method of manufacturing a sweatband in accordance with the present inventions.
Figure 10:
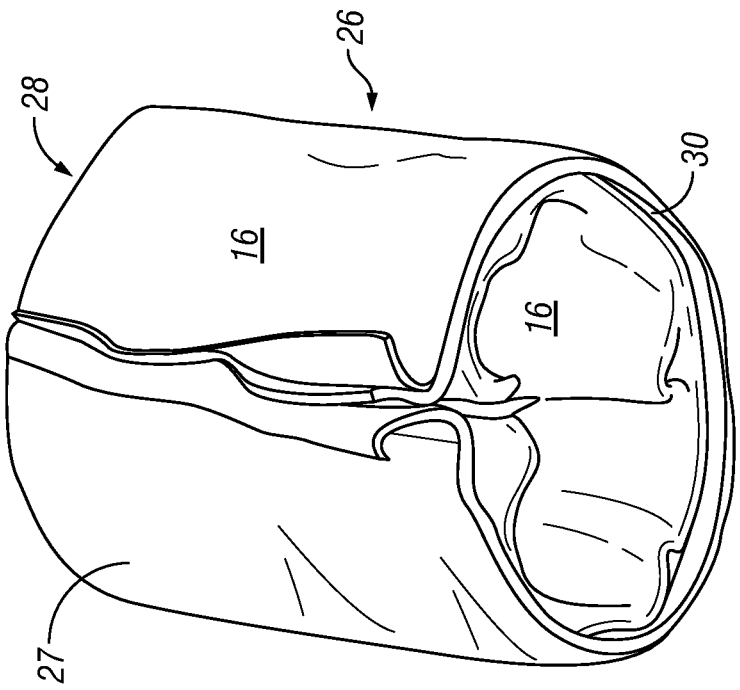
FIG. 10 is a top view showing the tube from FIGS. 7-9 fully folded over on itself, and illustrates part of a specific embodiment of a novel method of manufacturing a sweatband in accordance with the present inventions.
Figure 9:
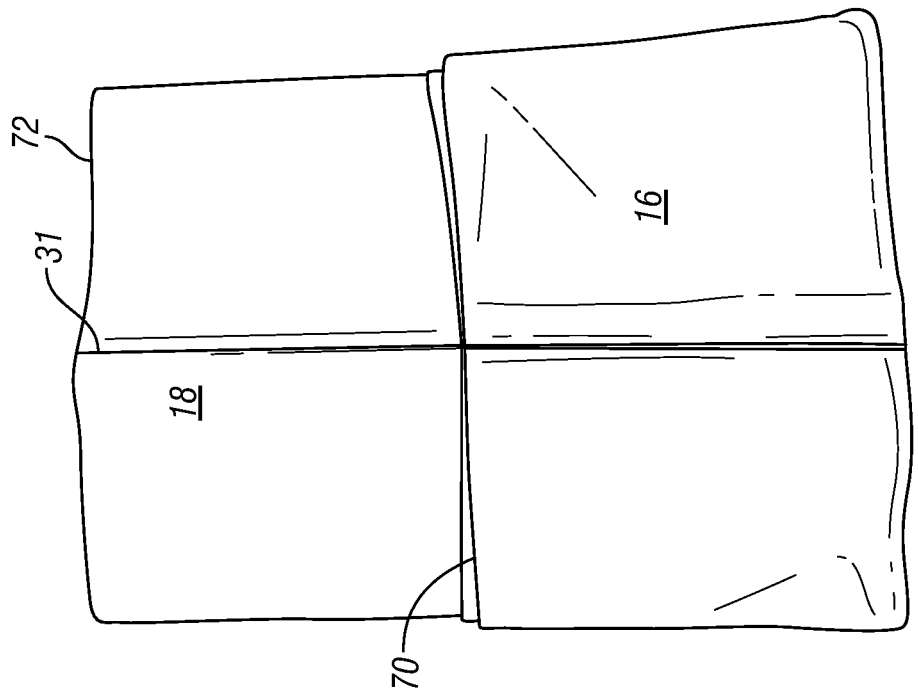
FIG. 9 is a top view showing a continuation of FIG. 8 and of the process of folding the tube from FIG. 7, and illustrates part of a specific embodiment of a novel method of manufacturing a sweatband in accordance with the present inventions.

Referring now to FIGS. 8-10, in a specific embodiment, the next step may be to roll the tube over on itself so that the upper and lower edges 70 and 72 of the tube 25 meet each other, with the second or soft fleece side 16 of the inner fleece layer 10 positioned on the outside. The beginning of this step is shown in FIG. 8, in which about ⅓ of the tube is shown rolled over on itself. FIG. 9 shows about ½ of the tube rolled over on itself. FIG. 10 shows the tube completely rolled over on itself, so that only the second or soft fleece side 16 of the inner fleece layer 10 is showing on the outside. At this point, it can be seen that a specific embodiment of a sweatband 26 is taking shape. In FIG. 10, it can be seen that an upper edge 28 of the sweatband 26 having a tubular body member 27 is formed by a fold, and a lower edge 30 of the sweatband 26 is made up of four layers of fabric material that are not connected to one another. In other words, the lower edge 30 of the sweatband 26 is defined by the lower and upper edges 70 and 72 of the tube 25. In a specific embodiment, at this stage of this process, all four edges of the fabric material (defined by the lower and upper edges 70 and 72 of the tube 25) preferably generally line up with each other, or are disposed adjacent one another. In a specific embodiment, at this stage of the process, the seam 31 formed by the stitching 24 (see FIG. 6 above) is preferably aligned after the tube 25 is rolled over. In FIG. 10, at this stage of the manufacturing process, the sweatband 26 is turned inside out. FIG. 10 also shows, at this stage, that the interior and exterior surfaces of the inside-out sweatband 26 in this view are formed of the second or soft fleece side (or absorbent silky fleece side) 16 of the inner fleece layer 10.

Figure 11:
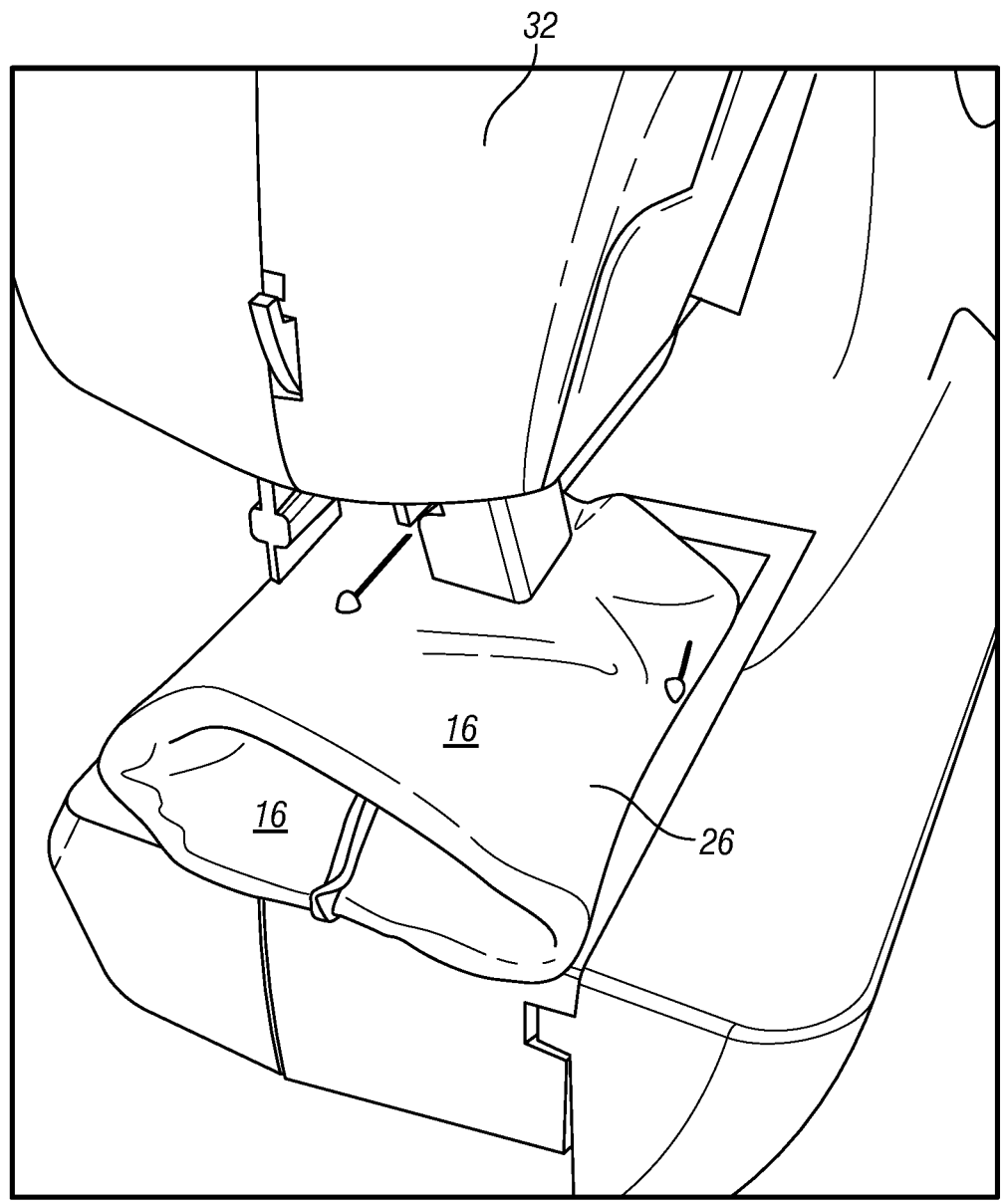
FIG. 11 is a perspective view of the tube shown in FIG. 10 positioned on a sewing machine and showing edges of the tube in the process of being sewn together, and illustrates part of a specific embodiment of a novel method of manufacturing a sweatband in accordance with the present inventions.
Figure 13:
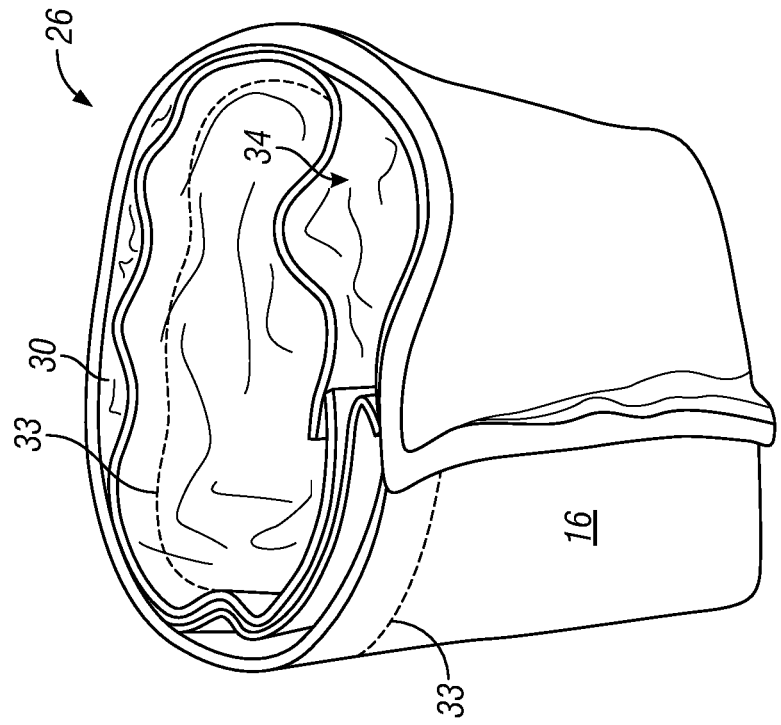
FIG. 13 is a perspective view of a sweatband after edges thereof have been partially sewn together and defining an opening along a seam thereof, and illustrates part of a specific embodiment of a novel method of manufacturing a sweatband in accordance with the present inventions.
Figure 12:
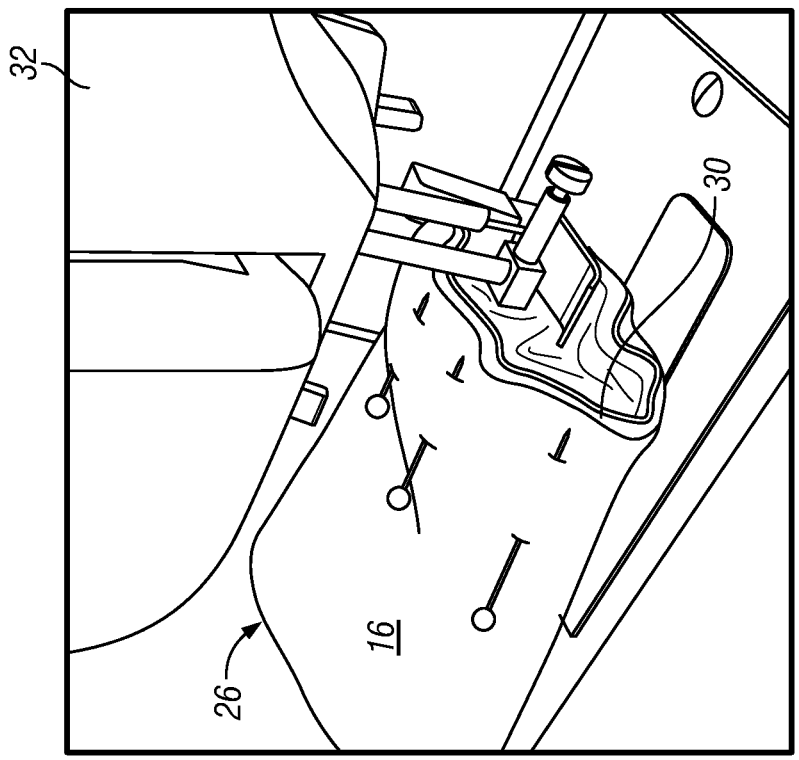
FIG. 12 is a view similar to FIG. 11 taken from a different perspective, and illustrates part of a specific embodiment of a novel method of manufacturing a sweatband in accordance with the present inventions.

Referring now to FIGS. 11-13, in a specific embodiment, the next step may be to sew the lower edge 30 of the sweatband 26 (which is formed by the lower and upper edges 70 and 72 of the tube 25) together to form a cuff-like tube, with the second or soft fleece side 16 of the inner fleece layer 10 facing outward and forming the interior surface of the sweatband 26. In a specific embodiment, a triple stretch stitch may be used to create a final and reinforcing seam to withstand stretching, pulling, and wear and tear of the sweatband. FIG. 11 shows a view of the sweatband 26 positioned on a sewing machine 32 taken from the folded end of the sweatband 26. FIG. 12 shows another view of the sweatband 26 still positioned on the sewing machine 32 taken from the end 30 of the sweatband 26 having the loose edges, and in the process of being sewn together. In a specific embodiment, the end 30 is not completely sewn together all the way around the circumference of the end 30 of the sweatband 26. For example, in a specific embodiment, such as shown in FIG. 13, by not sewing all the way around the circumference of the end 30 of the sweatband 26, a hole or opening 34 is defined in the end 30 of the sweatband 26. In a specific embodiment, the length of the opening 34 may be in the range of approximately 1.25 inches to 1.5 inches. FIG. 13 further illustrates stitching 33 installed by the sewing machine 32 (which forms a lateral seam 35 shown in FIG. 14 discussed below).

Figure 14:
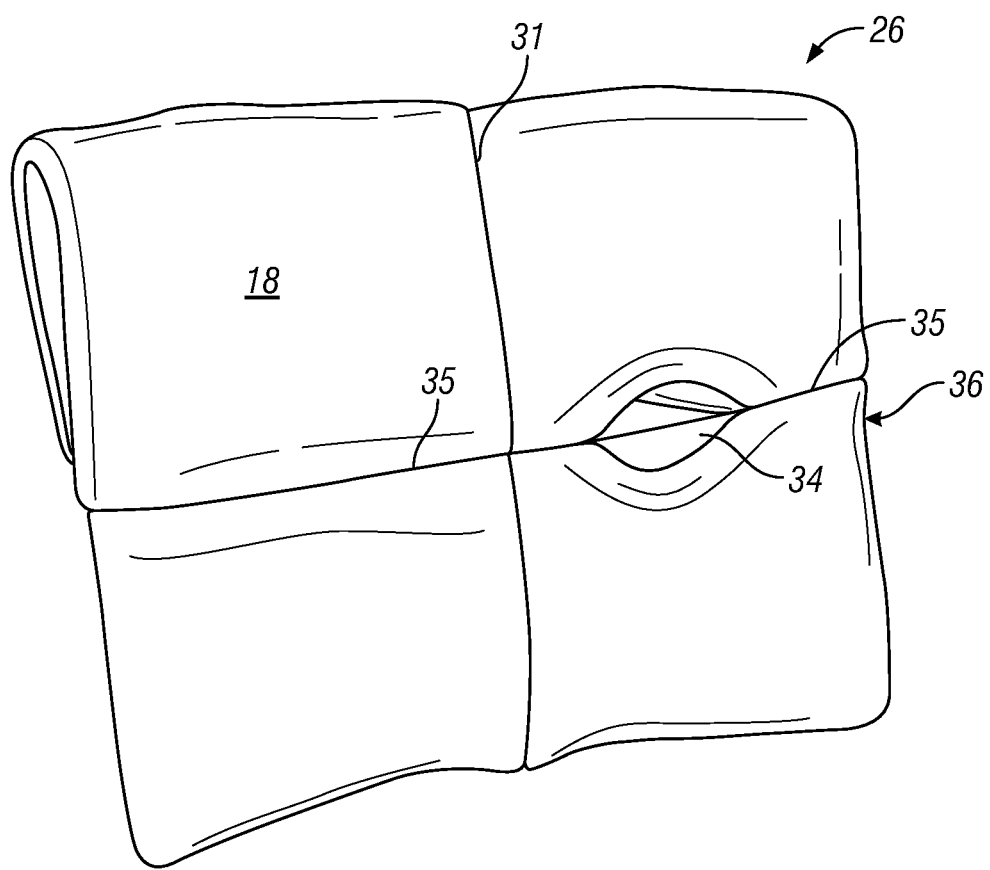
FIG. 14 is a top view showing the sweatband from FIG. 13 after it has been turned inside out, and illustrates part of a specific embodiment of a novel method of manufacturing a sweatband in accordance with the present inventions.

Referring now to FIG. 14, in a specific embodiment, the next step may be to pull the material through the opening 34 to turn the sweatband 26 inside out, so that the sweatband 26 is now in its final form for use with the internal seams hidden from view. In this final configuration, as shown in FIG. 14, the first or french terry loop side 18 of the french terry outer layer 12 is now on the outside of the sweatband 26, and also on the interior of the tube formed by the sweatband 26. In a specific embodiment, the opening 34 is spaced away from a finished, folded edge 36 of the sweatband 26. The opening 34 is disposed in line with the lateral seam 35. FIG. 14 also illustrates the transverse seam 31 that was formed by the stitching 24 discussed with respect to FIG. 6 above.

Figure 15:
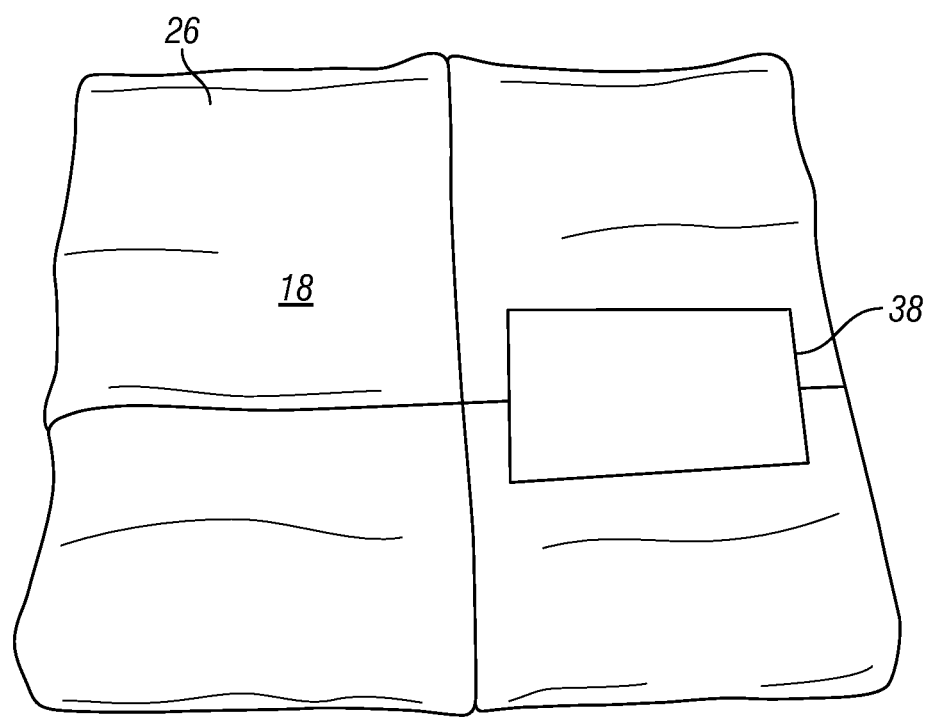
FIG. 15 is a top view similar to FIG. 14 but further showing a label positioned to cover the opening along the seam, and illustrates part of a specific embodiment of a novel method of manufacturing a sweatband in accordance with the present inventions.
Figure 16:
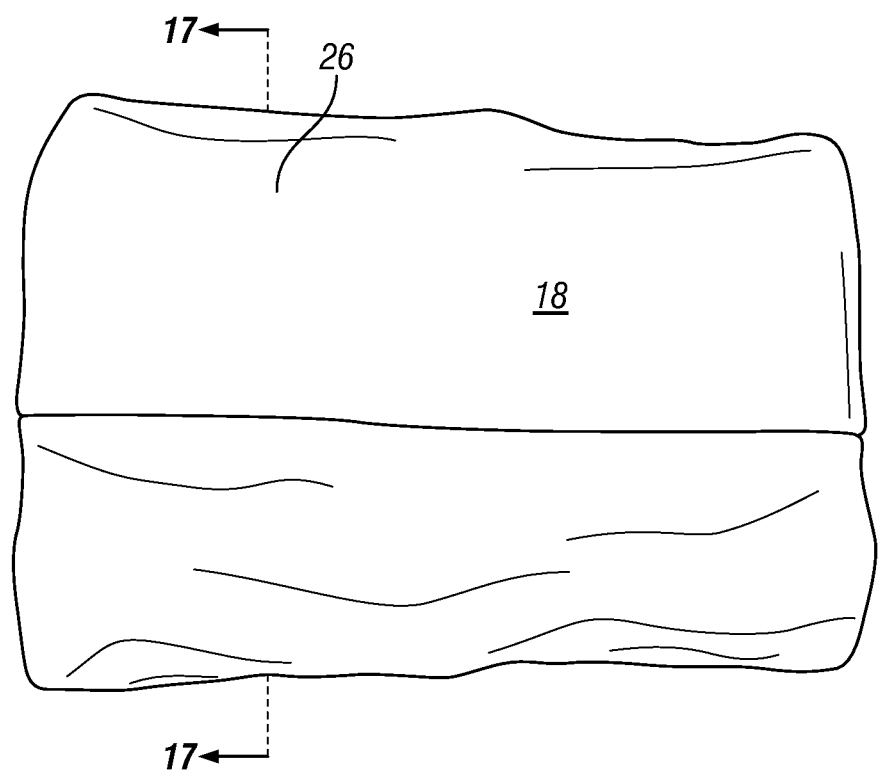
FIG. 16 is a top view similar to FIG. 15 but after the sweatband has been turned inside out to place the label on the interior surface of the sweatband, and illustrates part of a specific embodiment of a novel method of manufacturing a sweatband in accordance with the present inventions.

Referring now to FIG. 15, in a specific embodiment, the next step may be to position a label 38 over the opening 34 and attached, such as by sewing, to the sweatband 26 so as to cover the opening 34. With reference to FIG. 16, the sweatband 26 may turned inside out, as the sweatband 26 is fully reversible, so that the label 38 will be on the interior of the tube formed by the sweatband 26 so that the label 38 will lie against the skin when worn.

Figure 17:
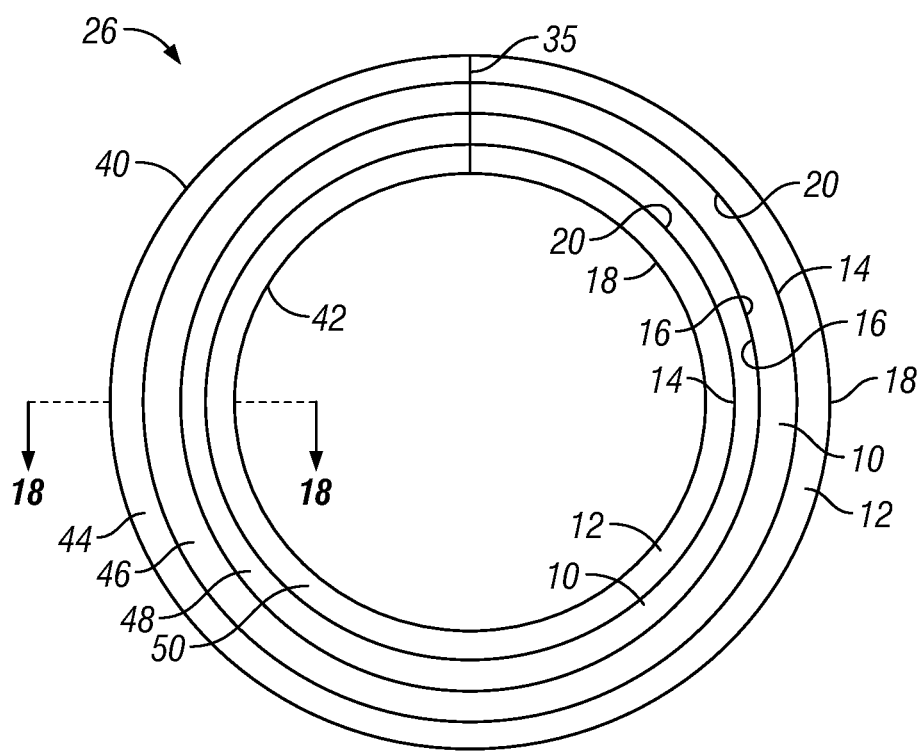
FIG. 17 is a cross-sectional view taken along line 17-17 of FIG. 16.

Referring now to FIG. 17, which is a cross-sectional view taken along line 17-17 of FIG. 16, it can be seen that, in a specific embodiment, the sweatband 26 may include four fabric layers, namely, an outer layer 44, a first internal layer 46, a second internal layer 48, and an inner layer 50. Two of the four layers, namely, the outer layer 44 and the inner layer 50, are formed by the outer french terry layer 12. The other two layers, namely, the first internal layer 46 and the second internal layer 48, which are sandwiched between the outer layer 44 and the inner layer 50, are formed by the inner fleece layer 10. Thus, in this specific embodiment, it can be seen that the exterior surface 40 of the sweat band 26 and the interior surface 42 of the sweat band 26 are formed of the first or french terry loop side 18 of the outer french terry layer 12.

Figure 18:
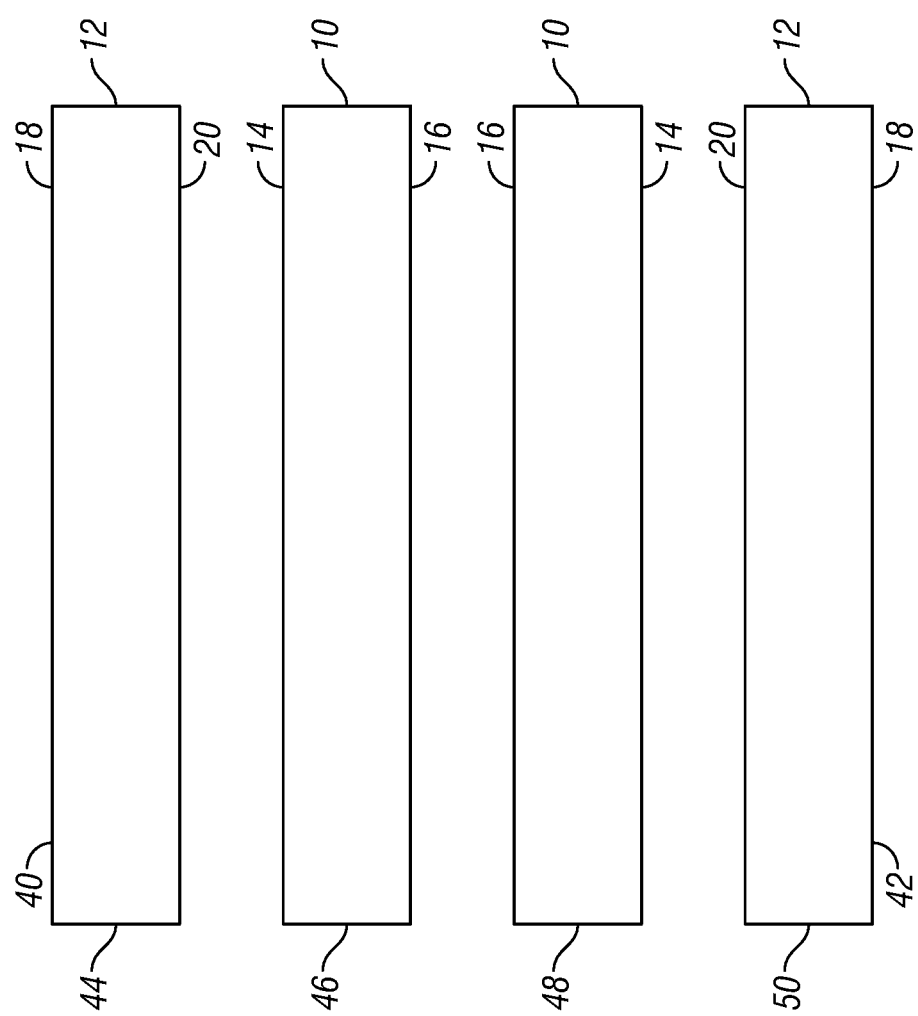
FIG. 18 is a cross-sectional view taken along line 18-18 of FIG. 17.

These details can also be seen in FIG. 18, which is a cross-sectional view taken along line 18-18 of FIG. 17 (note that the four layers of this cross section are shown separated from each other since they are not connected and to also more easily refer to the various surfaces of the four layers). Starting at the top of FIG. 18 and working downward, in this specific embodiment, the exterior surface 40 of the sweatband is formed the french loop side 18 of the french terry outer layer 12. The bottom surface 20 of the outer layer 44 is the smooth side of the french terry layer 12, which is facing the smooth side surface 14 of the first internal layer 46 formed by the fleece inner layer 10. The bottom surface 16 of the first internal layer 46 (which is the soft side of the fleece inner layer 10) is facing the upper surface 16 of the second internal layer 48 (which is also the soft side of the fleece inner layer 10). The same reference number 16 is used for these two surfaces because they are the same soft side 16 of the fleece inner layer 10, since it has be folded over on top of itself during the manufacturing process. The bottom surface 14 of the second internal layer 48 (which is the smooth side 14 of the fleece inner layer 10) is facing the upper surface 20 of the bottom layer 50 (which is the smooth side 20 of the french terry layer 12).

FIG. 18 illustrates that each side of the sweatband 26 in this specific embodiment may have four layers of fabric material, with the top two layers 44/46 being mirror images of the bottom two layers 48/50. Working in from the top and from the bottom of FIG. 18, there are wicking layers on the outer and inner surfaces 40 and 42, then there are wicking layers on the upper and lower surfaces 14 of the first and second internal layers 46 and 48, and then there are two absorbent layers 16 facing each other in the middle, one on the bottom of the first internal layer 46 and one on the top of the second internal layer 48. To summarize, in this specific embodiment, moving from top to bottom in FIG. 18, the progression is as follows: wicking, wicking, absorbent, absorbent, wicking, wicking. This provides double wicking from both directions, which draws moisture to dual absorbent layers in the middle. This combination functions in combination to increase wicking and moisture retention, while at the same time facilitating breathability of the sweatband.

From the above description it can be seen that the present inventions are directed to multi-layer sweatbands that may be reversible, lightweight, luxurious, and breathable against the skin in addition to having natural ultra-absorbent and anti-microbial properties that maintain an odor free sweatband. In specific embodiments, sweatbands according to the present inventions may be made in various sizes in both length and width to conform to a person's body part as needed. For example, in a specific embodiment, a wrist sweatband can be various lengths such as 3½" and 5" long in order to provide the user with different sweat absorption options. In a specific embodiment, one or more sweatbands can be placed along the wrists of the user to maintain an effective and dry hand grip on an instrument, as well as placed along the ankles to ensure dry stable footing, or around the head to stop sweat from running down the face from the head. The end result is the improved performance and safety in any form of sport and/or outdoor activity in addition to naturally resisting bacteria and fungus, and preventing the sweatband from emitting an unpleasant odor.

It is further evident from the above description that the present inventions represent improvements in both methods and sweatbands currently used by athletes during physical exertion. In a specific embodiment, the present inventions may utilize corresponding dual layers of lightweight 4-way stretch wicking and absorbing fabrics stitched together to produce a fully reversible slip-on band such that the user can wear the device on either side and receive the same benefit throughout the device. In a specific embodiment, the fabrics may be stitched together in such a way that no fastener is required and the properties of the band are consistent throughout the entire tube. Furthermore, in a specific embodiment, the fabrics may be made from ultra-comfortable, lightweight, and breathable bamboo, cotton, and nylon blends. In addition, when used in layers in accordance with the present inventions, the fabrics feel soft, luxurious, and breathable against the skin, and also exhibit natural ultra-absorbent and anti-microbial properties.

It can further be seen from the above description that a specific embodiment of the present inventions will improve upon existing methods of perspiration collection by offering a fully reversible multi-layered stretchable band that does not require a fastener, such as Velcro® fasteners or snaps, for example. In a specific embodiment of the present inventions, an outermost layer of a sweatband may focus on comfort and breathability for the user using a soft and luxurious outer wicking sheath that will move sweat to an innermost absorbent layer that is mainly comprised of bamboo due to its anti-microbial and ultra-absorbent properties. In a specific embodiment of the present inventions, one or more of the layers may have fabric blended with synthetic nylon or spandex material due to its elastic property such that the sweatband can be taken on and off and remain snug against a user's skin. In a specific embodiment of the present inventions, the reversibility of a sweatband may allow the perspiration to evaporate to the outside air as needed while still being worn, without becoming saturated and dripping on the user's body. In a specific embodiment of the present inventions, an outer sheath on one side can have one decorative design and then be reversed to show another decorative design. In another specific embodiment of the present inventions, sizing of a sweatband can be changed such that the sweatband can be worn around the wrists, the head/forehead as a headband/sweatband, or around another body part such as the ankle to prevent sweat from dripping down into the wearer's socks, or shoes. The sweatband can be sized to fit on body parts of various sizes on persons of various sizes. The sweatband can also be sized to fit around other body parts as needed such as the thighs, and even around the waist.

Sweatbands constructed in accordance with the present inventions may be unique in that its fabrics may be composed of more durable and more eco-friendly materials. In a specific embodiment, the outer wicking fabric 12 of the sweatband, which is on the reverse/interior and exterior sides of the sweatband, may mainly be composed of the environmentally friendly and sustainable Bamboo plant. Bamboo requires no fertilizer and self-regenerates from its own roots. When compared to cotton cultivation, which requires large amounts of water, pesticides and labor, the sweatband made using fabric including bamboo is eco smart. Bamboo fabric is a natural textile made from the pulp of bamboo grass. Bamboo rayon is made by dissolving pulp bamboo into its cellulose component and then spun into viscose fibers. Clothing made of bamboo rayon typically lasts longer and holds its shape even better than clothing made of simple bamboo fiber. Sweatbands according to the present inventions are eco smart and enjoy improved durability.

In a specific embodiment, sweatbands according to the present inventions may include an outer sheath fabric that is unique in its composition and properties that make it very soft, luxurious feeling, breathable and elastic. In a specific embodiment, the outer fabric layer 12 may be being made of 90% or higher rayon-processed bamboo and 5% to 7% nylon, lycra, or spandex, and may be produced for comfort as a soft stretchy jersey knit fabric thin enough to breathe while wicking sweat effectively away from the skin. Unlike cotton, bamboo fabric allows moisture to evaporate into the air quickly. Bamboo fabric is super light and silky soft. If the absorbent layer has not been fully saturated, the sweatband can be left to dry on its own in the hot sun or warm air.

In specific embodiments, sweatbands according to the present inventions may include an outer sheath fabric having various textures, weaving, and loops in order to provide different textures for the user to experience against their body part. An example of this would be a finely knit bamboo terry cloth meant to feel luxurious and soft against the skin, but still provide a similar wicking capability that will pull the perspiration from the skin and into the inner layer of the fabric.

In a specific embodiment, the outer sheath fabric may be installed with various designs or ornamentations meant to be pleasant to the user such as a printed work, logo, team name, number, saying, etc. In a specific embodiment, the outer sheath fabric may be made such that a different design will show when the band is reversed. This means that the wearer can have the option of wearing dual designs on one tubular device due to the reversibility of the band.

In a specific embodiment, sweatbands according to the present inventions may exhibit improved absorption over traditional sweatbands mostly composed of cotton. The properties of bamboo allow improved absorption over cotton fabric prior to saturation. In textile form, bamboo retains many of the properties it has as a plant. Bamboo is highly water absorbent, and is able to take up to three times its weight in water. The sweatband can more effectively absorb sweat and fully saturate the two absorbent fabric layers while evaporating moisture into the air quickly.

In a specific embodiment, sweatbands according to the present inventions may exhibit antibacterial and odor killing properties. Bamboo also has many antibacterial qualities, which bamboo fabric is able to retain, even through multiple washings. Bamboo exhibits up to a 99.8% antibacterial rate. This helps to reduce bacteria that thrive in clothing and causes unpleasant odors. It also kills odor causing bacteria that live on human skin, making the wearer and his or her sweatband remain odor free. The bamboo plant has a natural resistance to pest and fungal infestation due to an anti-microbial agent known as "bamboo kun" that prevents harmful matters from cultivating on the plant. A wet sweatband does not have to be immediately laundered since it is anti-microbial, anti-fungal, and avoids causing unpleasant odors. When fully saturated, a wearer does not need to be concerned with unpleasant odors. When not fully saturated, it can be left in the sun or warm weather to dry on its own. The natural wicking with moisture evaporation lets the user enjoy sustained physical activity without worrying about sweat running out of the sweatband.

In a specific embodiment, sweatbands employing two layers of wicking fabric being against each other on the both sides of the wristband, which are worn next to the skin whether using the sweatband on the reverse side or the regular side, these two layers of wicking fabric together can migrate sweat more effectively into the two absorbent layers of fabric thereby creating sustained dry skin even when the two absorbent layers of fabric (e.g., the absorbent sides 16 of the inner layers 10 that face each other in FIG. 18) are fully saturated. The wearer can experience longer periods of dry hands if wearing the sweatband at the wrist, and longer periods of dry feet if wearing the sweatband at the ankle, as well as longer periods of dry forehead if wearing the sweatband as a headband.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. For example, while the present inventions have been described in connection with a radial bearing, the present inventions are not so limited but instead are intended to encompass and/or by used in connection with any other composite articles. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims.

The invention claimed is:

1. A sweatband comprising:
a tubular body member formed of multiple layers of fabric,
the multiple layers of fabric including an outer layer, a first internal layer, a second internal layer and an inner layer,
a first side of the outer layer defining an exterior surface of the tubular body member,
a second side of the outer layer being disposed adjacent a first side of the first internal layer,
a second side of the first internal layer being disposed adjacent a second side of the second internal layer,
a first side of the second internal layer being disposed adjacent a second side of the inner layer, and
a first side of the second inner layer defining an interior surface of the tubular member.

2. The sweatband of claim 1, wherein:
the first side of the outer layer includes a wicking surface,
the first side of the first internal layer includes a wicking surface,
the first internal layer includes an absorbent material,
the second internal layer includes an absorbent material,
the first side of the second internal layer includes a wicking surface, and
the first side of the inner layer includes a wicking surface.

3. The sweatband of claim 1, wherein each of the outer layer and the inner layer includes a french terry material including bamboo, and each of the first internal layer and the second internal layer includes a fleece material including bamboo.

4. The sweatband of claim 1, wherein each of the first internal layer and the second internal layer includes an absorbent material.

5. The sweatband of claim 1, wherein each of the outer layer, the first internal layer, the second internal layer, and the inner layer comprises a fabric material containing bamboo.

6. The sweatband of claim 5, wherein the fabric material further contains at least one of nylon, lycra, and spandex.

7. The sweatband of claim 1, wherein each of the outer layer and the inner layer is formed of a french terry material containing bamboo, the french terry material including a loop surface on one side and a smooth surface on the other side, the first side of the outer layer corresponding to a loop surface of french terry material, the second side of the outer layer corresponding to a smooth surface of french terry material, the first side of the inner layer corresponding to a loop surface of french terry material, and the second side of the inner layer corresponding to a smooth surface of french terry material.

8. The sweatband of claim 1, wherein each of the first internal layer and the second internal layer is formed of a fleece material containing bamboo, the fleece material including a wicking surface on one side and an absorbent surface on the other side, the first side of the first internal layer corresponding to a wicking surface of fleece material, the second side of the first internal layer corresponding to an absorbent surface of fleece material, the second side of the second internal layer corresponding to an absorbent surface of fleece material, and the first side of the second internal layer corresponding to a wicking surface of fleece material.

9. A sweatband comprising:
a tubular body member formed of multiple layers of fabric,
the multiple layers of fabric including an outer layer, a first internal layer, a second internal layer and an inner layer,
a first side of the outer layer defining an exterior surface of the tubular body member and including a wicking surface,
a second side of the outer layer being disposed adjacent a first side of the first internal layer, the first side of the first internal layer including a wicking surface, the first internal layer including an absorbent material,
a second side of the first internal layer being disposed adjacent a second side of the second internal layer, the second internal layer including an absorbent material disposed adjacent the absorbent material in the first internal layer,
a first side of the second internal layer being disposed adjacent a second side of the inner layer and including a wicking surface, and
a first side of the inner layer defining an interior surface of the tubular member and including a wicking surface.

10. The sweatband of claim 9, wherein each of the outer layer and the inner layer includes a french terry material including bamboo, and each of the first internal layer and the second internal layer includes a fleece material including bamboo.

11. The sweatband of claim 9, wherein each of the outer layer, the first internal layer, the second internal layer, and the inner layer comprises a fabric material containing bamboo.

12. The sweatband of claim 11, wherein the fabric material further contains at least one of nylon, lycra, and spandex.

13. The sweatband of claim 9, wherein each of the outer layer and the inner layer is formed of a french terry material containing bamboo, the french terry material including a loop surface on one side and a smooth surface on the other side, the first side of the outer layer corresponding to a loop surface of french terry material, the second side of the outer layer corresponding to a smooth surface of french terry material, the first side of the inner layer corresponding to a loop surface of french terry material, and the second side of the inner layer corresponding to a smooth surface of french terry material.

14. The sweatband of claim 9, wherein each of the first internal layer and the second internal layer is formed of a fleece material containing bamboo, the terry material including a wicking surface on one side and an absorbent surface on the other side, the first side of the first internal layer corresponding to a wicking surface of fleece material, the second side of the first internal layer corresponding to an absorbent surface of fleece material, the second side of the second internal layer corresponding to an absorbent surface of fleece material, and the first side of the second internal layer corresponding to a wicking surface of fleece material.

15. A method of making a multi-layered, reversible sweatband comprising:
(a) providing an inner layer comprising a first rectangular piece of fabric material having a left edge, a top edge, a right edge, a bottom edge, a first side, and a second side;

(b) providing an outer layer comprising a second rectangular piece of fabric material having a left side, a top side, a right side, a bottom side, a first side, and a second side;
(c) positioning the outer layer on top of the inner layer with the second side of the outer layer resting on top of the first side of the inner layer, the left edge of the outer layer disposed adjacent the left edge of the inner layer, the top edge of the outer layer disposed adjacent the top edge of the inner layer, the right edge of the outer layer disposed adjacent the right edge of the inner layer, and the bottom edge of the outer layer disposed adjacent the bottom edge of the inner layer;
(d) folding the outer layer and inner layer over together and positioning the left edges of the outer layer and the inner layer adjacent the right edges of the outer layer and the inner layer to define a vertical edge and to form a vertical fold opposite and generally parallel to the vertical edge;
(e) sewing the left edges of the outer layer and the inner layer and the right edges of the outer layer and inner layer together along the vertical edge so as to form a tube;
turning the tube inside out so the first side of the outer layer is on the outside of the tube, an upper end of the tube is defined by the top edges of the inner layer and the outer layer, and a lower end of the tube is defined by the bottom edges of the inner layer and the outer layer;
(g) rolling the tube over on itself until the lower end of the tube is adjacent the upper end of the tube to form a tubular body member, the tubular body member having a first end defined by a fold and a second end defined by the lower and upper ends of the tube, and the second side of the inner layer is on the outside of the tubular body member;
(h) sewing a portion of the fabric layers defining the second end of the tubular body member together so as to leave an opening adjacent the second end of the tubular body member; and
(i) inverting the tubular body member by pulling the fabric material through the opening so that the first side of the outer layer defines an exterior surface of the tubular body member and an interior surface of the tubular member.

16. The method of claim 15, wherein the first rectangular piece of fabric material that forms the inner layer is an absorbent material.

17. The method of claim 15, wherein the first rectangular piece of fabric material that forms the inner layer is a fleece material containing bamboo.

18. The method of claim 15, wherein the second rectangular piece of fabric material that forms the outer layer is a wicking material.

19. The method of claim 15, wherein the second rectangular piece of fabric material that forms the outer layer is a french terry material containing bamboo, and the first side of the outer layer is a loop side of the french terry material.

20. The method of claim 15, wherein the inner layer includes a fabric length generally parallel to the left and right edges of the inner layer, the outer layer includes a fabric length generally parallel to the left and right edges of the outer layer, and the fabric length of the inner layer is positioned in generally parallel relationship to the fabric layer of the inner layer.

\* \* \* \* \*